United States Patent
Bales et al.

(10) Patent No.: US 11,468,089 B1
(45) Date of Patent: Oct. 11, 2022

(54) SYNCHRONIZATION OF DISTRIBUTED LEDGER PROCESSES

(71) Applicant: T-Mobile Innovations LLC, Overland Park, KS (US)

(72) Inventors: Mark R. Bales, Lee's Summit, MO (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 17/180,457

(22) Filed: Feb. 19, 2021

(51) Int. Cl.
*G06F 16/27* (2019.01)
*G06F 16/22* (2019.01)

(52) U.S. Cl.
CPC .......... *G06F 16/27* (2019.01); *G06F 16/2255* (2019.01)

(58) Field of Classification Search
CPC .............................. G06F 16/27; G06F 16/2255
See application file for complete search history.

(56) References Cited

U.S. PATENT DOCUMENTS

| | | | |
|---|---|---|---|
| 10,826,685 B1* | 11/2020 | Campagna | H04L 9/3247 |
| 11,239,999 B1* | 2/2022 | Winarski | H04L 9/12 |
| 2020/0328888 A1* | 10/2020 | Treat | H04L 67/1095 |
| 2021/0326977 A1* | 10/2021 | Sun | H04L 9/3239 |
| 2021/0357390 A1* | 11/2021 | Quick | G06F 16/9024 |
| 2022/0038289 A1* | 2/2022 | Huang | G06F 16/27 |

* cited by examiner

*Primary Examiner* — Khanh B Pham

(57) ABSTRACT

A method of building a first distributed ledger based on synchronization with a proxy distributed ledger comprising a genesis block of a second distributed ledger and a contiguous plurality of last blocks of the second distributed ledger. The method comprises initializing a first distributed ledger by creating a first genesis block comprising executable instructions that implement a smart contract; initializing the proxy distributed ledger as a combination of the blocks read from the second distributed ledger; and building the first distributed ledger by creating blocks and adding the blocks to the first distributed ledger, wherein each block comprises a content field created at least in part based on processing one of the blocks of the proxy distributed ledger in time synchronization based on executing the executable instructions stored in the first genesis block.

20 Claims, 9 Drawing Sheets

SYNCHRONIZATION OF DISTRIBUTED LEDGER PROCESSES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Distributed ledgers may be data structures that comprise blocks that are logically linked in a sequence. A distributed ledger may comprise an initial block referred to as a genesis block. The genesis block may comprise a nonce, a content field, and a hash value that is calculated over the nonce and the content field. The nonce may be a random number that is chosen to satisfy some criteria on the hash value, for example that the four most significant bits of the hash value are zeroes. Blocks added to the distributed ledger after the genesis block—which may be viewed as the root of the distributed ledger—comprise the hash value of the previous block (e.g., the hash of the genesis block if the block is the first block following the genesis block or the hash of the preceding block for later blocks), a nonce, a content field, and a hash over the hash of the preceding block, the nonce, and the content field.

In some cases, the content field of the genesis block of a distributed ledger may comprise instructions that implement a smart contract. These instructions, when executed by a processor, enforce the terms of the smart contract. Conventionally a smart contract and/or the instructions that implement the smart contract cannot be modified after they are deployed and/or implemented. A distributed ledger management application that maintains and interacts with the distributed ledger may provide the only access to the distributed ledger and hence can enforce the smart contract by executing the instructions stored in the genesis block. The distributed ledger may be said to be enclosed within a wrapper provided by the distributed ledger management application which mediates all writes to and all reads from the distributed ledger. In some contexts the combination of the distributed ledger management application and the "wrapped" distributed ledger itself may be conceptualized as a unified distributed ledger entity.

SUMMARY

In an embodiment, a method of synchronizing a plurality of distributed ledgers is disclosed. The method comprises initializing a first distributed ledger by a first distributed ledger management application executing on a computer system by creating a first genesis block comprising a nonce, a content field comprising metadata about the first distributed ledger, and a block hash value computed by hashing the nonce and the content field and building the first distributed ledger by the first distributed ledger management application by creating blocks and adding the blocks to the first distributed ledger, wherein each block comprises a block hash value of the preceding block of the first distributed ledger, a nonce, a content field, and a block hash value computed by hashing the block hash value of the preceding block, the nonce, and the content field of the block. The method further comprises initializing a second distributed ledger by a second distributed ledger management application executing on a computer system by creating a second genesis block comprising a nonce, a content field comprising metadata about the second distributed ledger, and a block hash value computed by hashing the nonce and the content field and building the second distributed ledger by the second distributed ledger management application by creating blocks and adding the blocks to the second distributed ledger, wherein each block comprises a block hash value of the preceding block of the second distributed ledger, a nonce, a content field, and a block hash value computed by hashing the block hash value of the preceding block, the nonce, and the content field of the block. The method further comprises initializing a third distributed ledger by a third distributed ledger management application executing on a computer system by creating a third genesis block comprising a nonce, a content field comprising metadata about the third distributed ledger, and a block hash value computed by hashing the nonce and the content field, wherein the metadata about the third distributed ledger comprises executable instructions that implement a smart contract associated with the third distributed ledger that defines building blocks of the third distributed ledger based in part on synchronized processing of blocks stored in the first distributed ledger and in the second distributed ledger and building the third distributed ledger by the third distributed ledger management application by creating blocks and adding the blocks to the third distributed ledger, wherein each block comprises a block hash value of the preceding block of the third distributed ledger, a nonce, a content field, and a block hash value computed by hashing the block hash value of the preceding block, the nonce, and the content field of the block, and wherein the content field is created based on processing a plurality of blocks of the first distributed ledger and a plurality of blocks of the second distributed ledger in time synchronization based on executing the executable instructions stored in the third genesis block.

In another embodiment, a method of building a first distributed ledger based on synchronization with a proxy distributed ledger comprising a genesis block of a second distributed ledger and a contiguous plurality of last blocks of the second distributed ledger is disclosed. The method comprises initializing a first distributed ledger by a distributed ledger management application executing on a computer system by creating a first genesis block comprising a nonce, a content field comprising metadata about the third distributed ledger, and a block hash value computed by hashing the nonce and the content field, wherein the metadata about the first distributed ledger comprises executable instructions that implement a smart contract associated with the first distributed ledger that defines building blocks of the first distributed ledger based in part on synchronized processing of blocks stored in a proxy distributed ledger and initializing the proxy distributed ledger by the distributed ledger management application by reading a genesis block of a second distributed ledger, reading a predefined number of blocks from an end of the second distributed ledger, and establishing the proxy distributed ledger as the combination of the blocks read from the second distributed ledger. The method further comprises building the first distributed ledger by the distributed ledger management application by creating blocks and adding the blocks to the first distributed ledger, wherein each block comprises a block hash value of the preceding block of the first distributed ledger, a nonce, a content field, and a block hash value computed by hashing the block hash value of the preceding block, the nonce, and the content field of the block, and wherein the content field is created at least in part based on processing one of the blocks of the proxy distributed ledger in time synchronization based on executing the executable instructions stored in the first genesis block.

In yet another embodiment, a method of tolling delivery of a wireless communication service in response to event triggers based on synchronization of a rating distributed ledger that changes over time with a toll assessment distributed ledger. The method comprises initializing a rating distributed ledger by a rating distributed ledger management application executing on a computer system by creating a first genesis block comprising a nonce, a content field comprising metadata about the rating distributed ledger, and a block hash value computed by hashing the nonce and the content field and building the rating distributed ledger by the rating distributed ledger management application by creating blocks and adding the blocks to the rating distributed ledger, wherein each block comprises a block hash value of the preceding block of the rating distributed ledger, a nonce, a content field, and a block hash value computed by hashing the block hash value of the preceding block, the nonce, and the content field of the block, wherein the content field comprises a rating schedule that maps communication events to a rate of payment for the associated communication events. The method further comprises initializing a communication events distributed ledger by a communication events distributed ledger management application executing on a computer system by creating a second genesis block comprising a nonce, a content field comprising metadata about the communication events distributed ledger, and a block hash value computed by hashing the nonce and the content field and building the communication events distributed ledger by the communication events distributed ledger management application by creating blocks and adding the blocks to the second distributed ledger, wherein each block comprises a block hash value of the preceding block of the communication events distributed ledger, a nonce, a content field, and a block hash value computed by hashing the block hash value of the preceding block, the nonce, and the content field of the block, wherein the content field comprises an identity of a communication event and a date and time associated with the communication event. The method further comprises initializing an assessed communication toll distributed ledger by an accessed communication toll distributed ledger management application executing on a computer system by creating a third genesis block comprising a nonce, a content field comprising metadata about the assessed communication toll distributed ledger, and a block hash value computed by hashing the nonce and the content field, wherein the metadata about the assessed communication toll distributed ledger comprises executable instructions that implement a smart contract associated with the assessed communication toll distributed ledger that defines building blocks of the assessed communication toll distributed ledger based in part on synchronized processing of blocks stored in the distributed ledger and in the second distributed ledger and building the assessed communication toll distributed ledger by the assessed communication toll distributed ledger management application by creating blocks and adding the blocks to the assessed communication toll distributed ledger, wherein each block comprises a block hash value of the preceding block of the third distributed ledger, a nonce, a content field, and a block hash value computed by hashing the block hash value of the preceding block, the nonce, and the content field of the block, and wherein the content field is created based on processing a plurality of blocks of the rating distributed ledger and a plurality of blocks of the communication events distributed ledger in time synchronization based on executing the executable instructions stored in the third genesis block.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
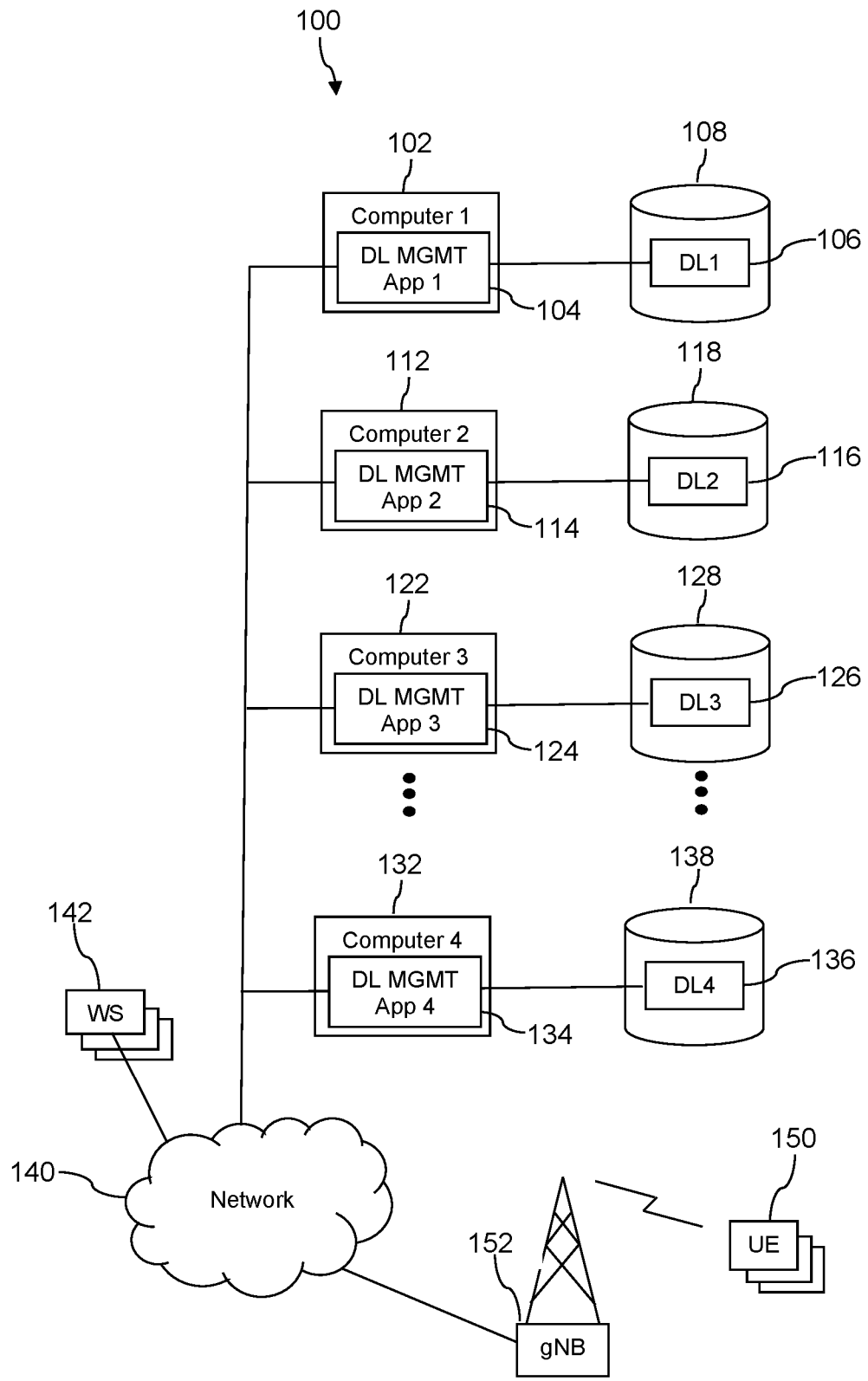
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosure teaches a system and method of synchronization between a plurality of distributed ledgers. Conventionally distributed ledgers are not synchronized with one another. A distributed ledger may be accessed to write content into and to read content out of the distributed ledger. In the teachings herein, one of a plurality of distributed ledgers may be said to synchronize with one or more of the plurality of distributed ledgers when generating its blocks. In a particular embodiment, the system and method of synchronization may be used to implement a billing or charging functionality in a wireless communication network. In an embodiment, this billing or charging functionality may be provided as a service in the form of a network function in a 5G core network. This billing or charging functionality may provide an alternative to third party billing services, and using third party billing services may be undesirable in some respects. For example, using third party billing services may involve an extra stage of system integration versus an in-house billing service. For example, using third party billing services may make deploying a new communication service more convoluted and complicated because the communication service provider may have to manage a change request project with the third party billing service to adapt their service in concert with the new communication service. For example, using third party billing services may be considered to inherently constitute a greater security threat versus an in-house billing service. In an embodiment, this billing or charging functionality may be provided as part of a policy charging function (PCF).

While applicable in this billing use case, these teachings about synchronizing distributed ledgers may provide benefits and advantages in other applications. For example, synchronizing distributed ledgers may be useful in generating corporate financial statements involving an inventory distributed ledger, a capital expense distributed ledger, and an operating expense distributed ledger. Additionally, while the disclosure speaks exclusively about distributed ledgers, these teachings may also advantageously be applied to a system of interrelated block chains. Both distributed ledgers and block chains are data structures that are conventionally deemed to make the data they store immutable (immutable in the sense, at least, that the processing burden of arbitrarily changing the distributed ledger or the block chain is so great as to deter all but the most determined cyber attacker). A distributed ledger comprises linked blocks, as in a block chain, but differs from a block chain by not being associated with high overhead consensus establishment processes. As used herein and for purposes of constructing the claims, the term distributed ledger is meant to be a comprehensive term that includes block chains as a special case of distributed ledger.

In an embodiment, a plurality of distributed ledgers may be used to perform a billing process, in part by embedding or encapsulating instructions representing a smart contract in at least one of the distributed ledgers. A first distributed ledger may store information about tax rates. A second distributed ledger may store information about communication service toll rates. A third distributed ledger may store communication events. Each distributed ledger would comprise a sequence of blocks. When new information is added to the subject distributed ledger, the new information is appended to the end of the distributed ledger in the form of a new block. It is noted that the building of the first, second, and third distributed ledgers may be conducted independently of the billing process and that other non-billing processes may read from the first, second, and third distributed ledgers. To perform billing, a billing rules engine first processes information about communication events read from the third distributed ledger. The billing rules engine then processes the communication events information based on information retrieved from the second distributed ledger about communication service toll rates. This results in a sort of "raw bill," a baseline bill, or a kernel bill. The billing rules engine then processes the "raw bills" based on tax information retrieved from the first distributed ledger.

In an embodiment, the rules engine comprises the instructions defining the smart contract, where the instructions are stored in a genesis block of a fourth distributed ledger. The blocks of the fourth distributed ledger correspond to bills (a first bill associated with a first account for a first period of time stored in a first block, a second bill associated with a second account for the first period of time stored in a second block, etc.). In another embodiment, the rules engine is separate from the fourth distributed ledger and executes the instructions defining the smart contract, where the instructions are stored in the genesis block of the fourth distributed ledger. A problem may arise, however, in accomplishing this processing in the context of dynamic data—in the context of changing tax rates and in the context of changing communication toll rates.

Taxes are incurred by communication events in the localities where the events take place, for example a tax is incurred where a wireless phone call is made or where a wireless data download to a phone occurs. John Doe incurs Kansas state taxes when he is in Kansas and places a cell phone call; he incurs New York state taxes when he is in New York and places a cell phone call; he incurs Texas state taxes when he is in Texas and places a cell phone call. The tax rates in the several states are changing in a dynamic way that is not coordinated with other states. This problem is further complicated because taxes may be collected at a state level (e.g., state taxes), at a municipal level (e.g., municipal taxes), and at a local level (e.g., locality taxes), and taxes may change at any of these levels in different jurisdictions in an uncoordinated way. Changes of taxes are represented in the first distributed ledger by adding a new block representing the new tax rate or new tax schedule. To apply a tax for a first time may entail referring to an m-th block in the first distributed ledger, while to apply a tax for a second time may entail referring to a z-th block in the first distributed ledger. A similar scenario applies likewise to communication toll rates. Likewise toll rates are being altered and new toll rates are being deployed all the time. This equates to changes in the toll rates stored in the second distributed ledger. Toll rates may be associated with specific subscriber plans. Changes of communication service toll rates are represented in the second distributed ledger by adding a new block representing the new communication service toll rates or new communication service toll schedule.

When the bills are processed, the communication events read from the third distributed ledger are associated with a date-time; the communication service toll rate that applies to this date-time is looked up in the second distributed ledger and the "raw bill" is calculated; then the tax rate that applies to this date-time is looked up in the first distributed ledger and the taxes on the "raw bill" are determined. In an embodiment, rather than repeatedly looking up information in the first distributed ledger and the second distributed ledger, the most recent blocks of these distributed ledgers—or simply the data content of these blocks rather than the entire blocks—are stored in a cached area of memory, and the billing rules engine works from the cached information. The billing rules engine may be implemented as a computer program or application that executes on a computer system, and the most recent blocks of the first and second distributed ledgers may be stored in a cache portion of memory of the same computer system. This process of aligning the communication events with the properly dated toll rate block and with the properly dated tax rate block is referred to as synchronizing these distributed ledgers.

The billing process for a wireless communication service provider is going on largely continuously, whereby to use billing computing resources efficiently. For example, a wireless communication service provider may have tens of millions of subscribers associated with millions of accounts (e.g., some accounts have a plurality of subscribers associated with the same accounts) and complete a billing cycle for each of these millions of accounts every month. This may, for example, involve performing the billing process for each of 200,000 different service accounts on each of about 25 days each month (allowing about 15% idle time for maintenance, unexpected increased processing loads, and other eventualities of operating a complex information technology system). It is this on-going billing processing that may be considered to be processing billing substantially continuously. Sometimes billing is generated that is out-of-synchronization, and the system and method taught herein, to achieve the kind of reliability and robustness called for in mission critical information technology systems, is designed to cope with such undesired accidents.

This out-of-synchronization billing (perhaps a day of a monthly bill, for example) is desirably detected and then corrected. There are a variety of approaches to this. In an embodiment, the billing rules engine registers with the process that maintains the first distributed ledger and with the second distributed ledger. When either distributed ledger changes (e.g., a new block is added to the distributed ledger with new information), the billing rules engine receives a notification. When so notified, the billing rules engine halts processing of additional billing events, determines what the changed information relates to, determines the validity date of the change, and identifies affected billing activities (not all billing actions that occurred since the validity date need to be altered—a tax change affecting California does not affect John Doe's cell call tax determination for calls in Kansas, New York, or Texas). These identified interim billing activities or results are corrected automatically by the billing rules engine (or, alternatively, are notified by the billing rules engine to an information technology worker who fixes the problem and causes the billing rules engine to resume processing where it stopped). The billing rules engine then continues on. Alternatively, in another embodiment, rather than using a registration/notification process, the billing rules engine periodically (e.g., every hour, every 4 hours, or some other periodic interval) checks to see if a new block (e.g., a change has occurred) has been added to either the second distributed ledger or to the third distributed ledger.

This synchronization process supports new models of service level agreement (SLA) based billing plans. Typically SLA based billing plans aggregate communication billing events on a monthly level of granularity. This process could support SLA based billing that segments the SLA period over shorter time intervals, and this could provide some interesting new pricing strategies for wireless communication service providers and for subscribers. This could be supported by updating the second distributed ledger with a new block defining a different communication service toll rate associated with the different SLA.

To support IoT devices and/or smart appliances billing themselves and paying for themselves, the second distributed ledger and the third distributed ledger may be stored in those IoT devices and/or smart appliances. In an embodiment, a "proxy" distributed ledger is stored in the IoT device and/or smart appliance which comprises only the tail of the subject distributed ledger and the "genesis" block of the distributed ledger. For example, the "proxy" distributed ledger may store the "genesis" block of the distributed ledger and the last five blocks of the distributed ledger, the last ten blocks, the last fifteen blocks the last thirty blocks, the last fifty blocks, or some other small number of blocks. This reduces the memory requirements of the IoT devices and/or smart appliances while notwithstanding allowing them to determine their own billing and paying their bill (e.g., a smart refrigerator tracks its own communication events, determines its "raw bill," determines its tax, and then authorizes a charge in the total bill amount to the carrier—all automatically). It is observed that this "proxy" distributed ledger is something different from a distributed ledger and could be referred to by an alternative name, for example a ledger fragment, a ledger section, a ledger scion, or some other appropriate term. IoT devices may have their communication services billed in aggregates or blocks of IoT devices. For example, a major energy company may have 1000 IoT devices that are billed as an aggregate communication service and the bill for this block of IoT devices is calculated based on the communication activities of all of these IoT devices as a community or colony of devices.

In an embodiment, the action attributed to the billing rules engine in the above description is provided by instructions stored in a genesis block of the fourth distributed ledger that implement or enforce smart contracts or microcontracts defining how billing is to be completed. Said in other words, rather than being standalone executable code, the function of the billing rules engine may be embedded, at least partially, in the genesis block of the fourth distributed ledger. In an embodiment, the genesis blocks of one or more of the first distributed ledger, the second distributed ledger, and/or the third distributed ledger may encapsulate executable code that may be executed to properly access and synchronize the distributed ledger it is located in. The bills generated by the processes described above would embed metadata along with the billing data that identifies the synchronization activities performed pursuant to generating the bill, whereby to audit the subject bill and verify that it was properly generated. Each subscriber or subscription account may be associated with a profile, and the profile may map to the appropriate toll rate in the second distributed ledger. Thus, when determining a bill for a given subscriber or subscription account, the process looks up the profile associated with that subscriber or subscription account, the process looks up the toll rate associated with that profile, and the process continues as described above. The fourth distributed ledger builds into itself the relationship to the first distributed ledger, to the second distributed ledger, and to the third distributed ledger. The final bills may be stored in a fourth distributed ledger.

Turning now to FIG. 1, a system 100 is described. In an embodiment, the communication system 100 comprises a plurality of distributed ledgers interconnected by a network that tracks and bills communication service events associated with user equipments (UE). A first computer system 102 executes a first distributed ledger management application 104 that manages a first distributed ledger 106 stored by a first data store 108. A second computer system 112 executes a second distributed ledger management application 114 that manages a second distributed ledger 116 stored in a second data store 118. A third computer system 122 executes a third distributed ledger management application 124 that manages a third distributed ledger 126 stored by a third data store 128. A fourth computer system 132 executes a fourth distributed ledger management application 134 that manages a fourth distributed ledger 136 stored by a fourth data store 138. Computer systems are described further hereinafter with reference to FIG. 6. In an embodiment, two or more of the computer systems 102, 112, 122, 132 may be deployed as a single computer system. In an embodiment, any of the computer systems 102, 112, 122, 132 may comprise a plurality of computers or servers.

The combination of the first computer system 102, the first distributed ledger management application 104, the first distributed ledger 106, and the first data store 108 may be abstracted as a first distributed ledger and may be referred to in some contexts as the first distributed ledger 106. This is a kind of conceptual simplification to make descriptions more streamlined. This is not dissimilar from the practice of referring to a database as a single unified entity when in fact it is most commonly a combination of a database management application executing on a computer system interacting with a secondary storage memory such as an array of disk drives or an array of optical memory drives or an array of solid-state memory drives. The combination of the second computer system 112, the second distributed ledger management application 114, the second distributed ledger 116, and the second data store 118 may be abstracted as a second distributed ledger and may be referred to in some contexts as the second distributed ledger 116. The combination of the third computer system 122, the third distributed ledger management application 124, the third distributed ledger 126, and the third data store 128 may be abstracted as a third distributed ledger and may be referred to in some contexts as the third distributed ledger 126. The combination of the fourth computer system 132, the fourth distributed ledger management application 134, the fourth distributed ledger 136, and the fourth data store 138 may be abstracted as a fourth distributed ledger and may be referred to in some contexts as the fourth distributed ledger 136.

The distributed ledgers 106, 116, 126, 136 are communicatively coupled to a network 140. The network 140 comprises one or more public networks, one or more private networks, or a combination thereof. One or more workstations 142 are communicatively coupled to the network 140 and may communicate therethrough to one or more of the distributed ledgers 106, 116, 126, 136. The system 100 provides wireless communication service to any number of UEs 150. For example, cell sites 152 provide a wireless communication link to the UEs 150 and communicatively couple the UEs 150 to the network 140. Any of the UEs 150 may be a cell phone, a smart phone, a personal digital assistant (PDA), a wearable computer, a headset computer, a laptop computer, a notebook computer, a tablet computer, or an Internet of things (IoT) device. The cell site 152 may provide a wireless link to a UE 150 according to a 5G, a long-term evolution (LTE), a code division multiple access (CDMA) or a global system for mobile communications (GSM) telecommunication protocol.

In an embodiment, information about tax rates related to wireless communication service billing are stored in the content fields of blocks in the first distributed ledger 106. The content fields of the blocks in the first distributed ledger 106 would also comprise information about the date that the tax rates go into effect. The content fields of the blocks in the first distributed ledger 106 may comprise information about the date and time the subject block was added to the first distributed ledger 106. Updates to the information about tax rates may be provided to the first distributed ledger 106 by one of the work stations 142 or a tax rate update server (not shown). The tax rate update may be provided to the first distributed ledger management application 104, and the first distributed ledger management application 104 may convert the representational form of the tax rate update received into a representation suitable for storing in the first distributed ledger 106. The tax rate update received from the work station 142 may identify a single tax rate update pertaining to one specific tax authority—a specific state tax authority, a specific municipality authority, or a specific locality authority. Alternatively, the tax rate update received may identify two or more tax rate updates pertaining to one or more specific tax authorities. The first distributed ledger management application 104 may generate a new block that comprises a content field that comprises the single tax rate update as well as other currently applicable tax rates associated with all other different jurisdictions and add the new block to the end of the first distributed ledger 106, whereby all the relevant tax rates that are current across the entire United States are available in the content field of the last block of the first distributed ledger 106. The content field of the new block comprises information about the date the subject tax rates go into effect. It is understood that existing blocks of the first distributed ledger 106, once placed on the first distributed ledger 106, cannot be altered, hence tax rate updates are propagated to the first distributed ledger 106 by creating a new block and adding it to the end of the first distributed ledger 106.

Alternatively, the first distributed ledger management application 104 may generate a new block that comprises a content field that comprises the single tax rate update as well as other currently applicable tax rates associated with all other different jurisdictions in a same regional partition that includes the tax rate update and add this new block to the end of the first distributed ledger 106, whereby all the relevant tax rates associated with all other different jurisdictions within the subject regional partition are available in the content field of the last block of the first distributed ledger 106. For example, one block of the first distributed ledger 106 may comprise a content field comprising all tax rates currently applicable in a northeastern United States regional partition; another block of the first distributed ledger 106 may comprise a content field comprising all tax rates currently applicable in a southeastern United States regional partition; another block of the first distributed ledger 106 may comprise a content field comprising all tax rates currently applicable in a midwestern United States regional partition, and so on. Alternatively, the first distributed ledger 106 may comprise a plurality of separate distributed ledgers managed by the first distributed ledger management application 104, wherein each separate distributed ledger comprises blocks whose content fields comprise all tax rates currently applicable in a United States regional partition (e.g., a different distributed ledger managed by the first distributed ledger management application 104 is provided for each different United States regional partition).

In an embodiment, the regional partitions are associated with the boundaries of US states. A regional partition may comprise a single US state or may comprise a plurality of US states. A regional partition may comprise a plurality of contiguous US states. A regional partition may comprise a plurality of US states, at least some of which are not contiguous with others of the US states of the regional partition. In another embodiment, however, regional partitions may be associated with boundaries that pass through the interiors of states.

In an embodiment, information about communication service toll rates are stored in the content fields of blocks in the second distributed ledger 116. The content fields of the blocks in the second distributed ledger 116 would also comprise information about the date the communication service toll rates go into effect. The content fields of the blocks in the second distributed ledger 116 may comprise information about the date and time the subject block is added to the second distributed ledger 116. Updates to the information about communication service toll rates may be provided to the second distributed ledger 116 by one of the work stations 142 or by a toll rate update server (not shown). The communication service toll rate update may be provided to the second distributed ledger management application 114, and the second distributed ledger management application 114 may convert the representational form of the communication service toll rate update received into a representation suitable for storing in the second distributed ledger 116. The second distributed ledger management application 114 creates a new block, places the information about the toll rate update in the content field of the new block, and appends the new block to the end of the second distributed ledger 116. The content field of the new block comprises information about the date the subject communication service toll rate or rates goes into effect. It is understood that existing blocks of the second distributed ledger 116, once placed on the second distributed ledger 116, cannot be altered, hence communication service toll rate updates are propagated to the second distributed ledger 116 by creating a new block and adding it to the end of the second distributed ledger 116.

In an embodiment, the content field of the last block of the second distributed ledger 116 comprises all currently applicable communication service toll rates. Alternatively, each block of the second distributed ledger 116 has a content field that comprises information about the applicable communication service toll rate or rates applicable for a single subscriber profile. Alternatively, the second distributed ledger 116 may comprise a plurality of separate distributed ledgers managed by the second distributed ledger management application 114, wherein each separate distributed ledger comprises blocks whose content fields comprise all communication service toll rates currently applicable for a single subscriber profile (e.g., a different distributed ledger managed by the second distributed ledger management application 114 is provided for each different subscriber profile or subscriber service plan). It is understood that a single subscriber profile may be applicable to a plurality of subscription accounts. In an embodiment, a single subscriber profile may be substantially the same as a communication service plan such as may be offered by a wireless communication service provider to subscribers.

In an embodiment, as communication events associated with a UE 150 occur, information about the communication events is provided to the third distributed ledger management application 124, the third distributed ledger management application 124 creates one or more new blocks having a content field comprising the service event information and a time and date associated with the service event, and the third distributed ledger management application 124 adds the new block or blocks to the third distributed ledger 126. The communication events may be initiations of phone calls, terminations of phone calls, data session connections, data session terminations, measurement information such as time duration or incremental passage of time and data rates or data tonnage. In an embodiment, the information about the communication events experienced by the UEs 150 may be generated by a node or function (not shown) in the network 140, aggregated by the node or function, and then provided as a single roll-up summary of a plurality of communication events by the node or function to the third distributed ledger management application 124.

In an embodiment, bills for communication service consumed by the UEs 150 and information about the bills are generated by the fourth distributed ledger management application 134, the bill and associated information are stored in a content field of a new block, and the new block is added to the fourth distributed ledger 136. In an embodiment, all bills and associated information for all subscription accounts are stored in blocks in the same fourth distributed ledger 136. Alternatively, the fourth distributed ledger 136 comprises a plurality of different distributed ledgers managed by the fourth distributed ledger management application 134 wherein subscription accounts are partitioned according to an algorithm to different partitions, a different distributed ledger managed by the fourth distributed ledger management application 134 is associated with each different partition, and bills associated with subscription accounts are placed in blocks that are added to the associated distributed ledger.

In an embodiment, a genesis block (e.g., a first block) of the fourth distributed ledger 136 that does not comprise a hash of a preceding block because no other block precedes the genesis block has a content field that comprises instructions that implement a smart contract that defines how billing calculations are performed. In an embodiment, the instructions in the genesis block provide the actual instructions that cause, when executed by the fourth distributed ledger management application 134, the actual bills to be calculated. Because the instructions, in this embodiment, are stored in the genesis block of the fourth distributed ledger 136, the instructions are deemed unalterable—as are all the blocks in the fourth distributed ledger 136 once they have been incorporated into the fourth distributed ledger 136. Alternatively, the instructions in the genesis block provide a reference to a secure memory location that stores the executable instructions that calculate actual bills. The secure memory location may be in the fourth data store 138 or in a protected memory partition of the fourth computer system 132. The bills may be calculated partly by the fourth distributed ledger management application 134 executing the instructions stored in the genesis block and partly by the fourth distributed ledger management application 134 executing the instructions stored in the secure memory location pointed to by the instructions in the genesis block. This alternative provides for modifying or updating at least some of the instructions that are executed to calculate actual bills while still retaining control and security over the bill calculation process. For example, instructions referenced by the instructions stored in the genesis block but stored outside the genesis block may be updated without breaking the paradigm that blocks previously added to the fourth distributed ledger 136 are unalterable. The portion of the fourth distributed ledger management application 134 that executes the instructions stored in the genesis block and possibly executes instructions stored in the secure memory location(s) pointed to by the instructions in the genesis block may be referred to as a billing rules engine in some contexts.

As actual bills are calculated by the fourth distributed ledger management application 134 and stored in content fields of blocks to be added to the fourth distributed ledger 136, metadata about the process followed to calculate the bills is stored in the content field along with the actual bill. This metadata may be used to audit the bills and assure that they have been properly calculated, for example have properly synchronized with the tax rate information stored in the first distributed ledger 106 and have properly synchronized with the communication service toll rate information stored in the second distributed ledger 116. The metadata, for example, may identify specific blocks referenced by the fourth distributed ledger management application 134 and/or by the instructions stored in the genesis block of the fourth distributed ledger 136 and/or by the instructions referenced by the instructions stored in the genesis block of the fourth distributed ledger 136. Because a bill may be calculated based on a plurality of different communication service events associated with the UEs 150, where different service events occur at different times, a plurality of blocks from the first distributed ledger 106 and/or a plurality of blocks from the second distributed ledger 116 may be used to build the bill for the subject UE 150 or UEs 150.

In an embodiment, the fourth distributed ledger management application 134 may cache the last few blocks of the first distributed ledger 106 (e.g., tax rates) and the last few blocks of the second distributed ledger 116 (e.g., communication service toll rates) in a location in memory of the fourth computer system 132 whereby to speed its access to tax rates and communication service tool rates when calculating a plurality of bills. In an embodiment where the first distributed ledger 106 comprises a plurality of distributed ledgers and/or the second distributed ledger 116 comprises a plurality of ledgers, a few blocks from the ends of each of the distributed ledgers may be cached, for example at least all blocks added during the most recent billing period and one block from the previous billing period.

The fourth distributed ledger management application 134 may register with the first distributed ledger management application 104 and with the second distributed ledger management application 114 to receive notification of updates. When such an update notification is received, the fourth distributed ledger management application 134 may refresh its cache of the associated distributed ledger, for example by obtaining updated blocks and adding them to the cache. The first distributed ledger management application 104 may provide a notification registration service whereby an application (e.g., the fourth distributed ledger management application 134) may register to receive notifications on the event of a new block being added to the first distributed ledger 106. The second distributed ledger management application 114 may provide a notification registration service whereby an application may register to receive notifications on the event of a new block being added to the second distributed ledger 116. The notification registration process and the sending of notifications in these cases can be deemed to support and/or to be a form of distributed ledger synchronization.

Alternatively, the fourth distributed ledger management application 134 may periodically query the first distributed ledger management application 104 and the second distributed ledger management application 114 to find out if the subject distributed ledger has been updated. If a response indicates a distributed ledger has been updated, the fourth distributed ledger management application 134 may refresh its cache of the associated distributed ledger, for example by obtaining updated blocks and adding them to the cache. The fourth distributed ledger management application 134 may poll the distributed ledger management applications 104, 114 periodically every minute, every five minutes, every fifteen minutes, every 30 minutes, every hour, every four hours, once per day, once every two days, or once per week, or on some other periodic interval. The process of learning of updates by the fourth distributed ledger management application 134 and refreshing its cache of the first and second distributed ledgers 106, 116 may be referred to as synchronization of the distributed ledgers 106, 116 with the distributed ledger 136.

Synchronization also comprises detecting when processing of bills by the fourth distributed ledger management application 134 was completed using out-of-date information from the first distributed ledger 106 or from the second distributed ledger 116 and correctly reprocessing those bills based on one or more updates to the distributed ledgers 106, 116. When the fourth distributed ledger management application learns of an update to either of the distributed ledgers 106, 116 it determines the validity date of the update, it checks to identify out-of-synchronization bills it has calculated (a bill or portion of a bill was calculated using an outdated tax rate or an outdated communication service toll rate), and it recalculates those bills. These recalculated bills are added to the content filed of one or more new blocks by the fourth distributed ledger manager application 134 and added to the fourth distributed ledger 136. In an embodiment, the blocks created pursuant to a recalculated bill may have a flag or other indication added to its content field to indicate this correction of an out-of-synch related bill, whereby to avoid sending out that out-of-synch bill. Again, note that a block added to the fourth distributed ledger 136 cannot be altered once it is added. Alternatively, in an embodiment, the data store 138 comprises a validity vector where each element in the validity vector corresponds to a single block in the fourth distributed ledger 136. When a block is added to the fourth distributed ledger 136, a corresponding element is added to the validity vector and initiated to a value that indicates valid. When it is later determined, during a synchronization action, that a block in the fourth distributed ledger 136 is invalid because of being unsynchronized, the element in the validity vector may be set to a value that indicates the corresponding block in the fourth distributed ledger 136 is invalid. In later sending out bills or actioning bills based on the blocks in the fourth distributed ledger 136, the fourth distributed ledger management application 134 may pass over blocks that are associated with a validity vector element having a value indicating invalid.

In an embodiment, the fourth distributed ledger management application 134 may calculate an aggregate communication service toll for a subscription account to produce a raw bill and then calculate a tax on this raw bill and add the tax to the raw bill to arrive at a total bill. In an embodiment, the fourth distributed ledger management application 134 may calculate an accumulated bill for a subscription account at different points of a billing cycle whereby to provide information to a subscriber of service fees accumulated to date in the billing cycle. This bill accumulated-to-date value may be based on only the raw bill portion of the bill. This bill accumulated-to-date value may include the sum of the raw bill accumulated-to-date plus the calculated tax accumulated-to-date. This bill accumulated-to-date value may include the sum of the raw bill accumulated-to-date plus an estimate of tax accumulated-to-date, where the estimate of tax may be based on determining an average ratio of raw bill to total bill for the subscription account, without performing the exact calculation of each service communication event toll based on different tax rates of different regions where the communication events occurred.

Figure 2A:
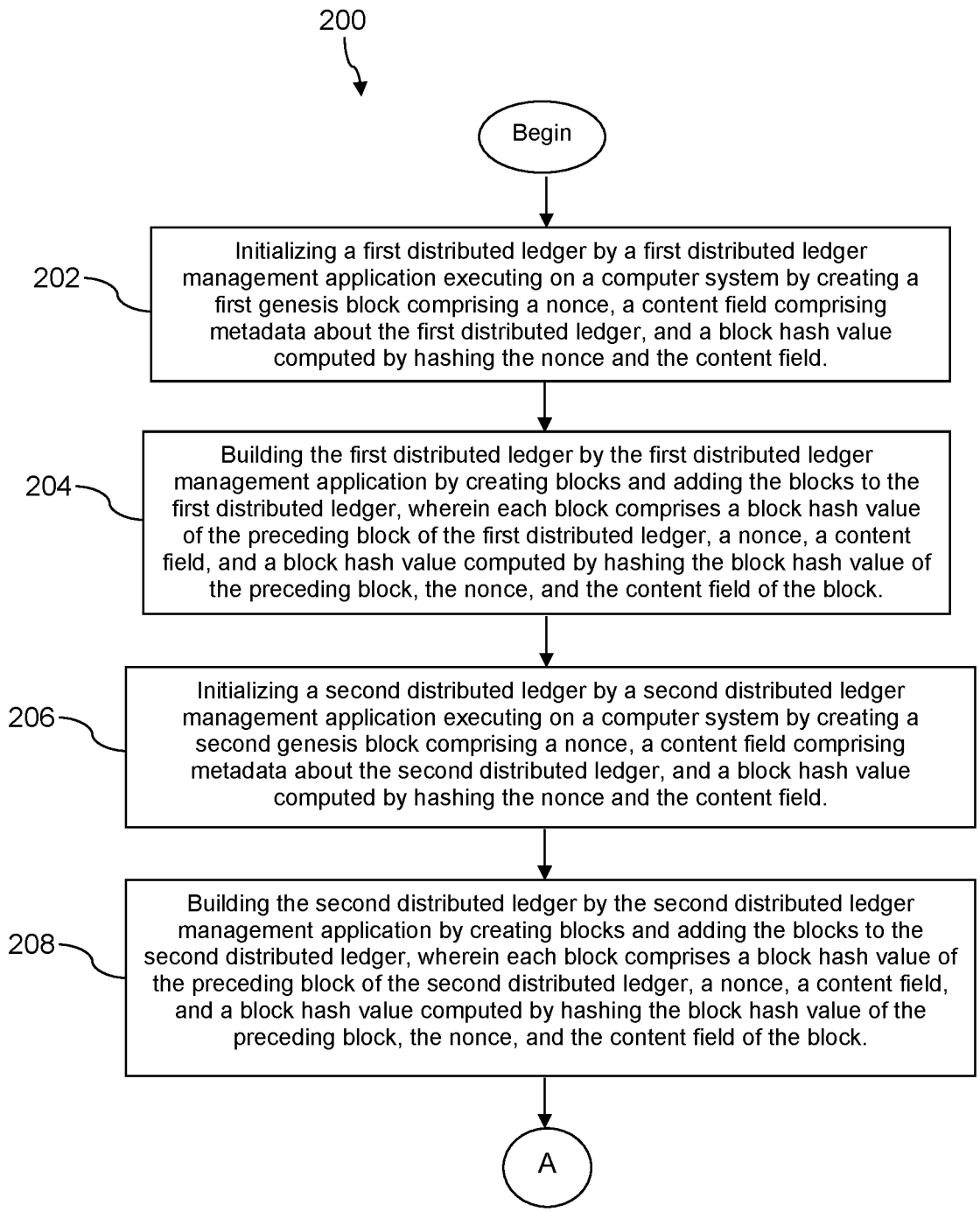
FIG. 2A and FIG. 2B are a flow chart of a method according to an embodiment of the disclosure.
Figure 2B:
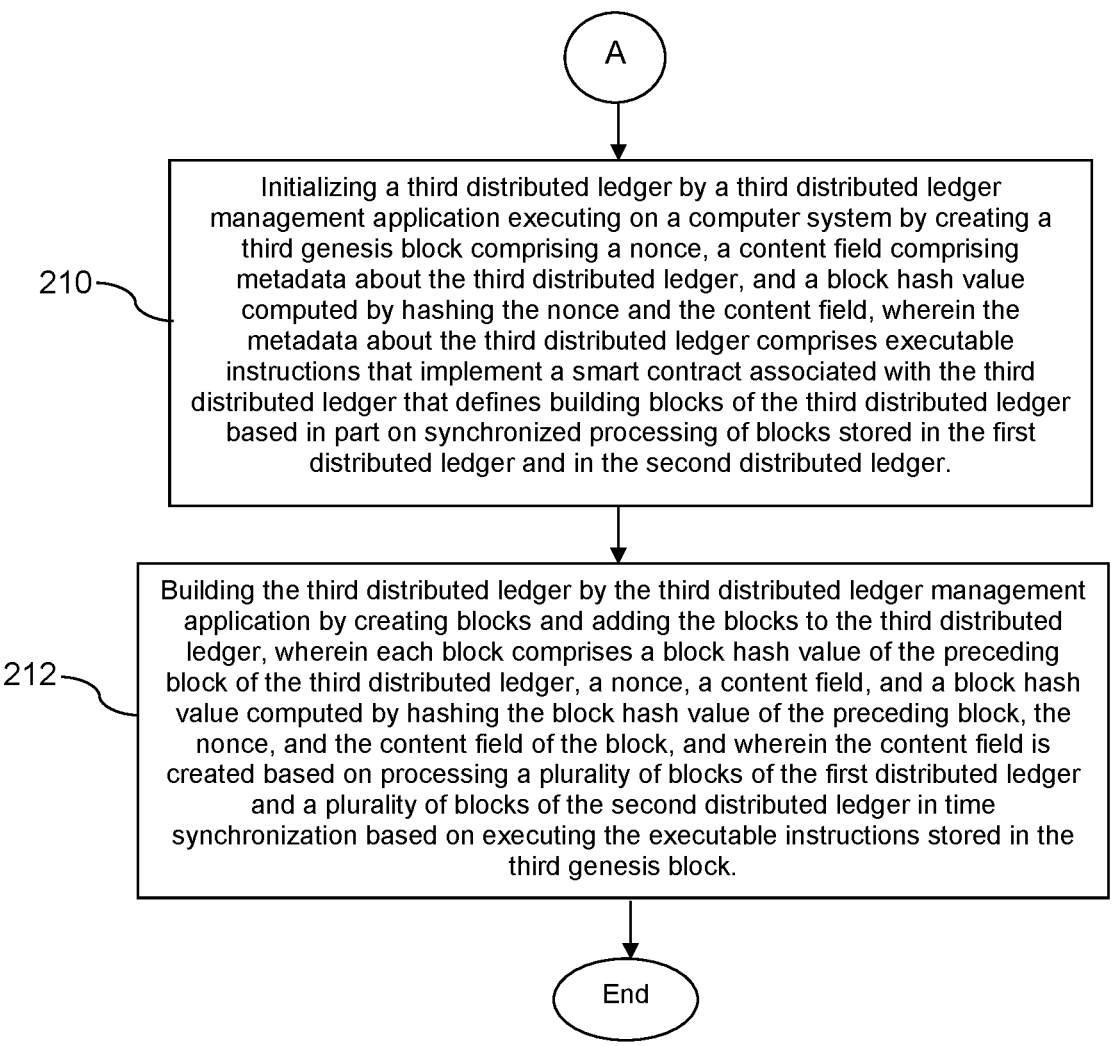

Turning now to FIG. 2A and FIG. 2B, a method 200 is described. In an embodiment the method 200 is a method of synchronizing a plurality of distributed ledgers. At block 202, the method 200 comprises initializing a first distributed ledger by a first distributed ledger management application executing on a computer system by creating a first genesis block comprising a nonce, a content field comprising metadata about the first distributed ledger, and a block hash value computed by hashing the nonce and the content field. At block 204, the method 200 comprises building the first distributed ledger by the first distributed ledger management application by creating blocks and adding the blocks to the first distributed ledger, wherein each block comprises a block hash value of the preceding block of the first distributed ledger, a nonce, a content field, and a block hash value computed by hashing the block hash value of the preceding block, the nonce, and the content field of the block.

At block 206, the method 200 comprises initializing a second distributed ledger by a second distributed ledger management application executing on a computer system by creating a second genesis block comprising a nonce, a content field comprising metadata about the second distributed ledger, and a block hash value computed by hashing the nonce and the content field. At block 208, the method 200 comprises building the second distributed ledger by the second distributed ledger management application by creating blocks and adding the blocks to the second distributed ledger, wherein each block comprises a block hash value of the preceding block of the second distributed ledger, a nonce, a content field, and a block hash value computed by hashing the block hash value of the preceding block, the nonce, and the content field of the block.

At block 210, the method 200 comprises initializing a third distributed ledger by a third distributed ledger management application executing on a computer system by creating a third genesis block comprising a nonce, a content field comprising metadata about the third distributed ledger, and a block hash value computed by hashing the nonce and the content field, wherein the metadata about the third distributed ledger comprises executable instructions that implement a smart contract associated with the third distributed ledger that defines building blocks of the third distributed ledger based in part on synchronized processing of blocks stored in the first distributed ledger and in the second distributed ledger.

At block 212, the method 200 comprises building the third distributed ledger by the third distributed ledger management application by creating blocks and adding the blocks to the third distributed ledger, wherein each block comprises a block hash value of the preceding block of the third distributed ledger, a nonce, a content field, and a block hash value computed by hashing the block hash value of the preceding block, the nonce, and the content field of the block, and wherein the content field is created based on processing a plurality of blocks of the first distributed ledger and a plurality of blocks of the second distributed ledger in time synchronization based on executing the executable instructions stored in the third genesis block. In an embodiment, the content field of blocks of the third distributed ledger are created in time synchronization in part based on the third distributed ledger management application selecting blocks from the first distributed ledger based on a validity date of the blocks of the first distributed ledger and based on the third distributed ledger management application selecting blocks from the second distributed ledger based on a validity date of the blocks of the second distributed ledger.

In an embodiment, method 200 further comprises receiving a notification by the third distributed ledger management application from the first distributed ledger management application, wherein the notification indicates that a new block has been added to the first distributed ledger; determining by the third distributed ledger management application that a block on the third distributed ledger is out-of-synchronization with the first distributed ledger based on the notification; and creating a new block by the third distributed ledger management application and adding the new block to the third distributed ledger, wherein the content field of the new block of the third distributed ledger is created based on processing at least the new block of the first distributed ledger and based on processing at least one of the blocks of the second distributed ledger, and wherein the new block of the third distributed ledger supersedes the out-of-synchronization block on the third distributed ledger. The method 200 may further comprise designating the out-of-synchronization block on the third distributed ledger as invalid. This designation may be created in a data structure external to the third distributed ledger, for example in the validity vector data structure described above. Alternatively, the designation of invalid blocks on the third distributed ledger may be stored in a table external to the third distributed ledger where each entry in the table identifies one of the blocks on the third distributed ledger. In an embodiment, the table may comprise entries only for blocks on the third distributed ledger that are invalid.

In an embodiment, the method 200 further comprises the third distributed ledger application registering with the first distributed ledger to receive notifications when the first distributed ledger application adds new blocks to the first distributed ledger; the first distributed ledger determining that it has added a new block to the first distributed ledger; and, based on determining it has added a new block to the first distributed ledger, sending the notification indicating the new block has been added to the first distributed ledger by the first distributed ledger application to the third distributed ledger application based on the third distributed ledger application registering to receive notifications. In an embodiment, the executable instructions in the metadata of the content field of the third genesis block comprise references to instructions stored outside of the third distributed ledger and wherein executing the executable instructions stored in the third genesis block by the third distributed ledger management application comprises following the references and executing the referenced instructions stored outside of the third distributed ledger. In an embodiment, the method 200 further comprising reading a plurality of blocks from an end of the first distributed ledger by the third distributed ledger management application and storing the plurality of blocks in a memory cache in the computer system that the third distributed ledger management application executes on, wherein the third distributed ledger processing a plurality of blocks of the first distributed ledger comprises processing the plurality of blocks stored in the memory cache.

Figure 3:
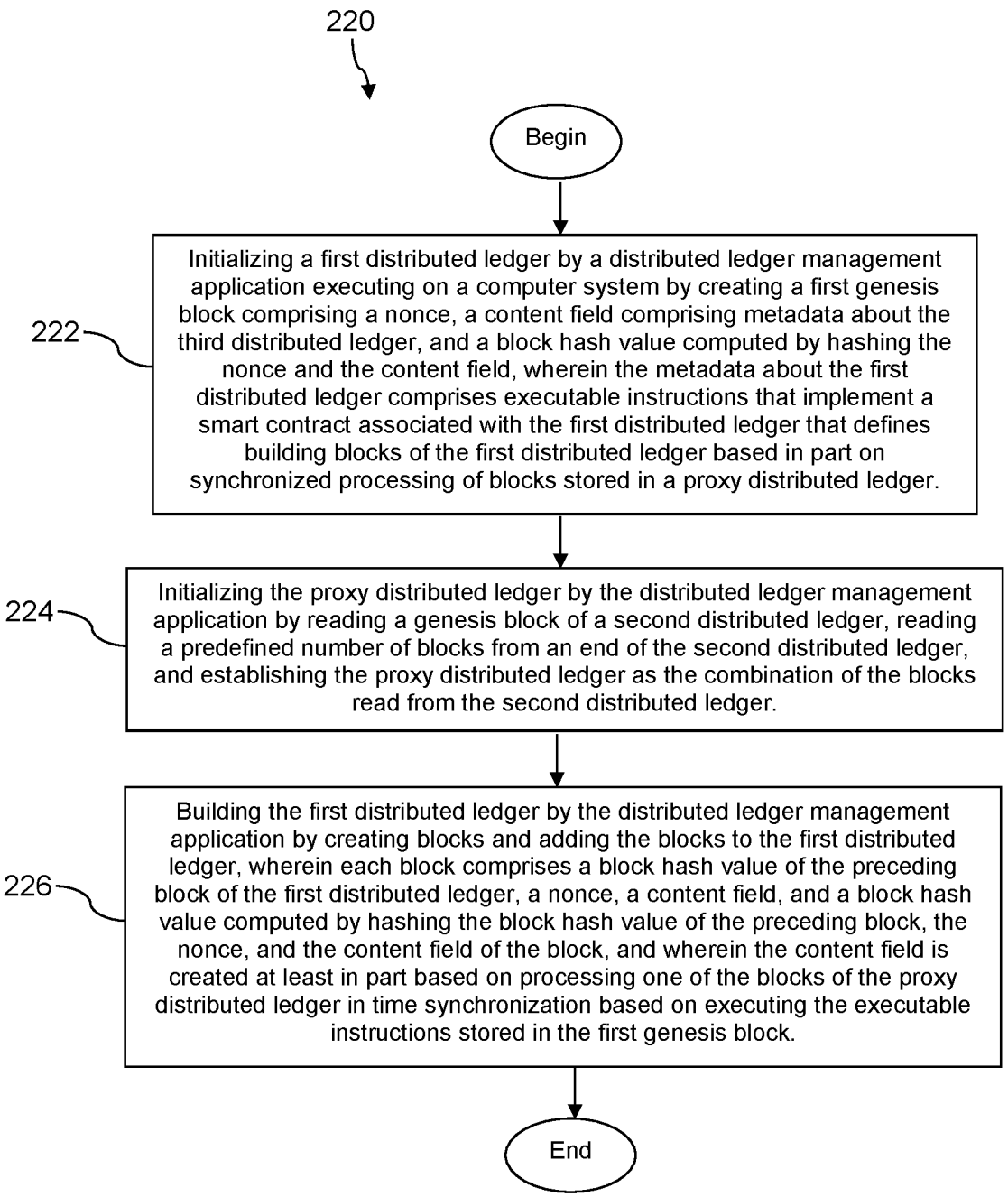
FIG. 3 is a flow chart of another method according to an embodiment of the disclosure.

Turning now to FIG. 3, a method 220 is described. In an embodiment, method 220 is a method of building a first distributed ledger based on synchronization with a proxy distributed ledger comprising a genesis block of a second distributed ledger and a contiguous plurality of last blocks of the second distributed ledger. The contiguous plurality of last blocks of the second distributed ledger may comprise the last five blocks, the last ten blocks, the last twenty blocks, the last fifty blocks, or the last one hundred blocks of the second distributed ledger. At block 222, method 220 comprises initializing a first distributed ledger by a distributed ledger management application executing on a computer system by creating a first genesis block comprising a nonce, a content field comprising metadata about the third distributed ledger, and a block hash value computed by hashing the nonce and the content field, wherein the metadata about the first distributed ledger comprises executable instructions that implement a smart contract associated with the first distributed ledger that defines building blocks of the first distributed ledger based in part on synchronized processing of blocks stored in a proxy distributed ledger.

At block 224, method 220 comprises initializing the proxy distributed ledger by the distributed ledger management application by reading a genesis block of a second distributed ledger, reading a predefined number of blocks from an end of the second distributed ledger, and establishing the proxy distributed ledger as the combination of the blocks read from the second distributed ledger. At block 226, method 220 comprises building the first distributed ledger by the distributed ledger management application by creating blocks and adding the blocks to the first distributed ledger, wherein each block comprises a block hash value of the preceding block of the first distributed ledger, a nonce, a content field, and a block hash value computed by hashing the block hash value of the preceding block, the nonce, and the content field of the block, and wherein the content field is created at least in part based on processing one of the blocks of the proxy distributed ledger in time synchronization based on executing the executable instructions stored in the first genesis block. In an embodiment, processing the one of the blocks of the proxy distributed ledger in time synchronization comprises selecting the one of the blocks based on a validity date of the block stored in a content field of the block.

In an embodiment, the method 220 further comprises receiving by the distributed ledger management application a notification from the second distributed ledger that a new block has been added to the second distributed ledger; reading the new block by the distributed ledger management application from the second distributed ledger; and adding the new block by the distributed ledger management application to the proxy distributed ledger. In an embodiment, the method 220 further comprises determining by the distributed ledger application that a block on the first distributed ledger is out of synch with the second distributed ledger based on a validity date stored in a content field of the new block added to the proxy distributed ledger and creating a new block by the distributed ledger management application and adding the new block to the first distributed ledger, wherein the content field of the new block on the first distributed ledger is created based on processing the new block added to the proxy distributed ledger, wherein the new block on the first distributed ledger supersedes an out-of-synchronization block on the first distributed ledger. In an embodiment, the method 220 further comprises designating by the distributed ledger management application the out-of-synchronization block on the first distributed ledger as invalid.

In an embodiment, the blocks after the genesis block in the first distributed ledger comprise a content field that defines a bill for wireless communication service. In an embodiment, the blocks after the genesis block in the second distributed ledger comprises a content field that defines tax rates for wireless communication services.

Figure 4A:
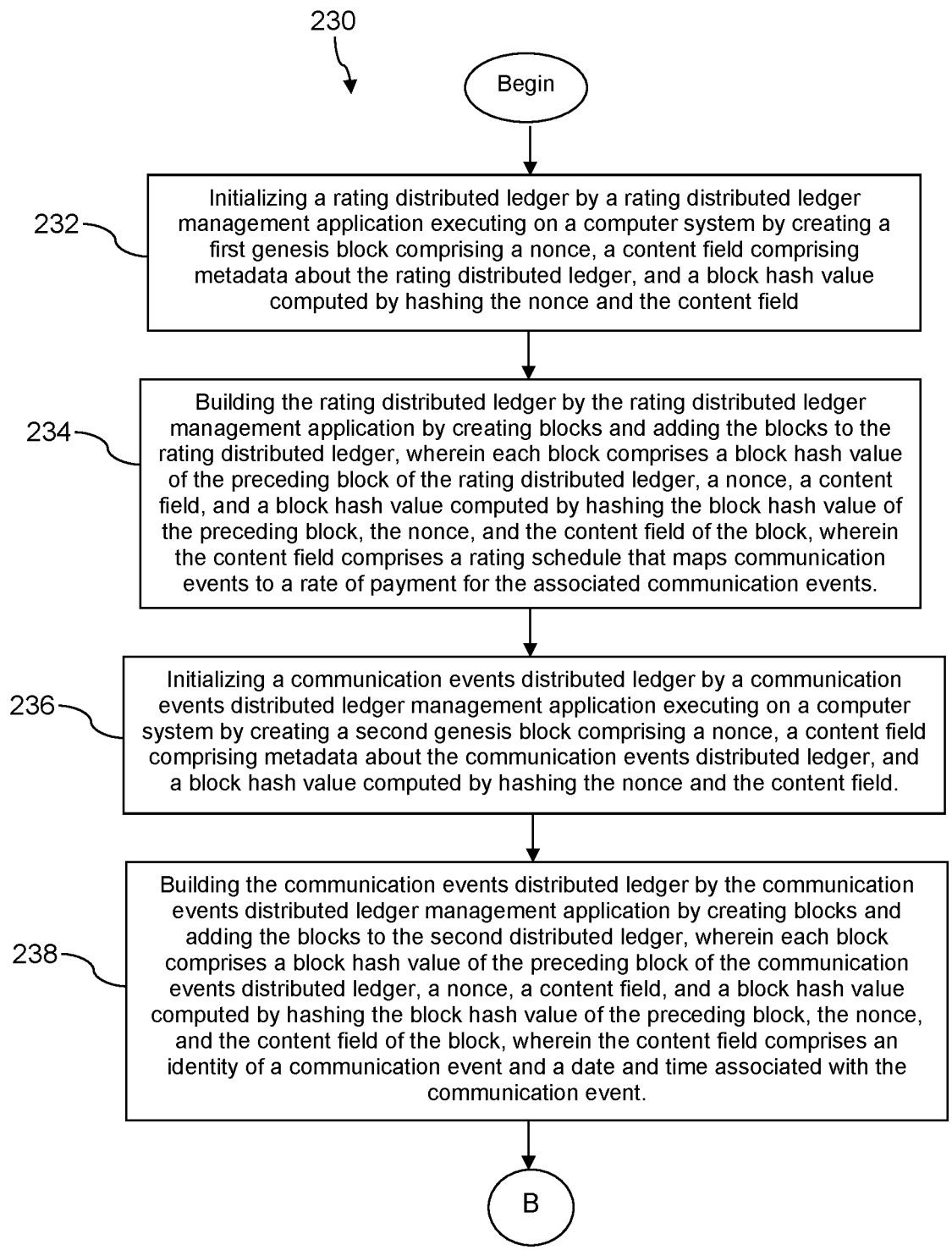
FIG. 4A and FIG. 4B is a flow chart of yet another method according to an embodiment of the disclosure.
Figure 4B:
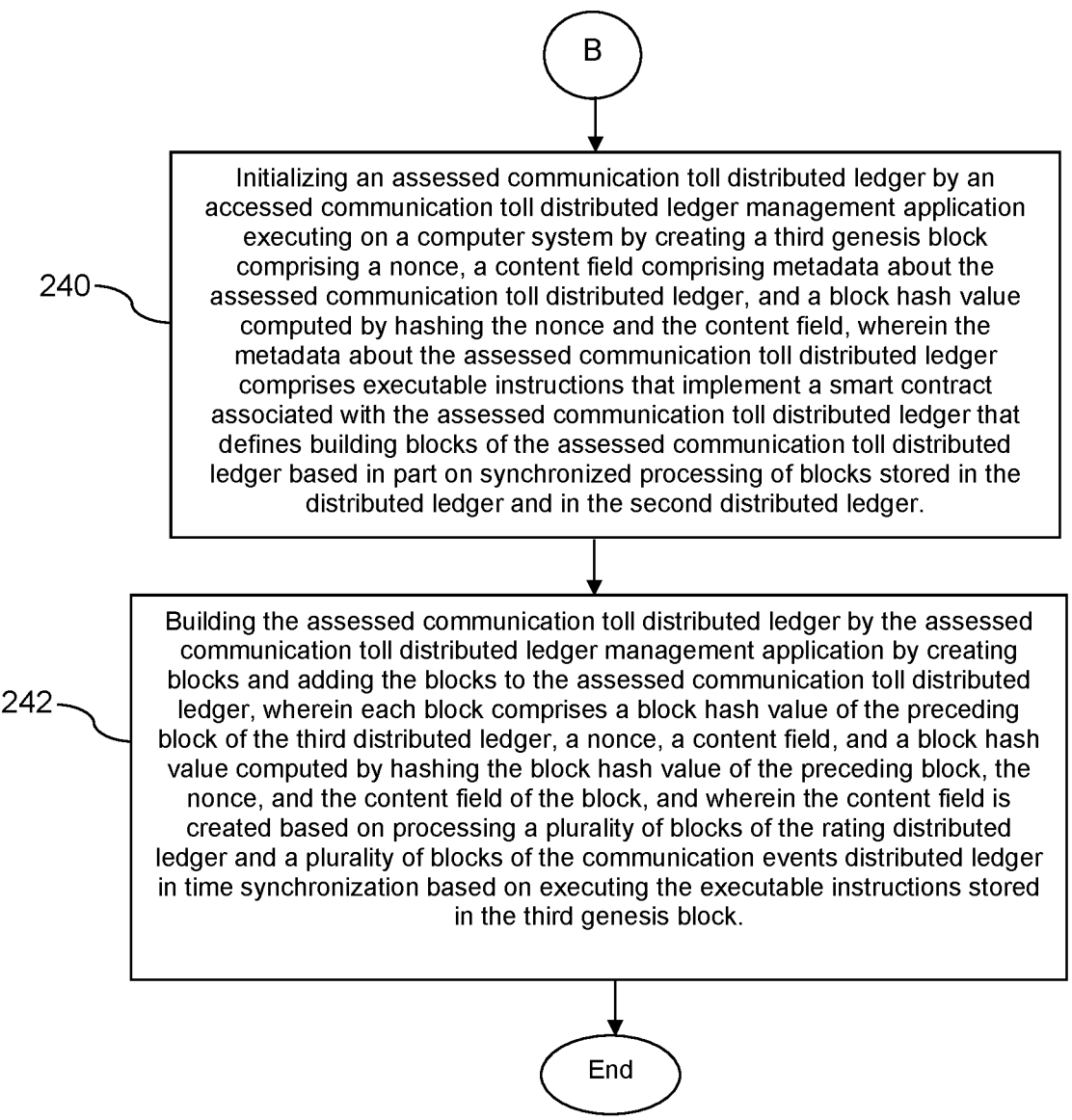

Turning now to FIG. 4A and FIG. 4B, a method 230 is described. In an embodiment, method 230 is a method of tolling delivery of a wireless communication service in response to event triggers based on synchronization of a rating distributed ledger that changes over time with a toll assessment distributed ledger. At block 232, the method 230 comprises initializing a rating distributed ledger by a rating distributed ledger management application executing on a computer system by creating a first genesis block comprising a nonce, a content field comprising metadata about the rating distributed ledger, and a block hash value computed by hashing the nonce and the content field.

At block 234, the method 230 comprises building the rating distributed ledger by the rating distributed ledger management application by creating blocks and adding the blocks to the rating distributed ledger, wherein each block comprises a block hash value of the preceding block of the rating distributed ledger, a nonce, a content field, and a block hash value computed by hashing the block hash value of the preceding block, the nonce, and the content field of the block, wherein the content field comprises a rating schedule that maps communication events to a rate of payment for the associated communication events.

At block 236, the method 230 comprises initializing a communication events distributed ledger by a communication events distributed ledger management application executing on a computer system by creating a second genesis block comprising a nonce, a content field comprising metadata about the communication events distributed ledger, and a block hash value computed by hashing the nonce and the content field. At block 238, the method 230 comprises building the communication events distributed ledger by the communication events distributed ledger management application by creating blocks and adding the blocks to the second distributed ledger, wherein each block comprises a block hash value of the preceding block of the communication events distributed ledger, a nonce, a content field, and a block hash value computed by hashing the block hash value of the preceding block, the nonce, and the content field of the block, wherein the content field comprises an identity of a communication event and a date and time associated with the communication event. In an embodiment, the communication event identified in the content field of the blocks of the communication events distributed ledger comprises an initiation of a phone call, a termination of a phone call, a data session connection, a data session termination, or a measurement information. In an embodiment, the content field of each block of the communication events distributed ledger identifies a user equipment (UE). In an embodiment, the UE identified in the content field of each block of the communication events distributed ledger is a cell phone, a smart phone, a personal digital assistant (PDA), a wearable computer, a headset computer, a laptop computer, a notebook computer, a tablet computer, or an Internet of things (IoT) device.

At block 240, the method 230 comprises initializing an assessed communication toll distributed ledger by an accessed communication toll distributed ledger management application executing on a computer system by creating a third genesis block comprising a nonce, a content field comprising metadata about the assessed communication toll distributed ledger, and a block hash value computed by hashing the nonce and the content field, wherein the metadata about the assessed communication toll distributed ledger comprises executable instructions that implement a smart contract associated with the assessed communication toll distributed ledger that defines building blocks of the assessed communication toll distributed ledger based in part on synchronized processing of blocks stored in the distributed ledger and in the second distributed ledger.

At block 242, the method 230 comprises building the assessed communication toll distributed ledger by the assessed communication toll distributed ledger management application by creating blocks and adding the blocks to the assessed communication toll distributed ledger, wherein each block comprises a block hash value of the preceding block of the third distributed ledger, a nonce, a content field, and a block hash value computed by hashing the block hash value of the preceding block, the nonce, and the content field of the block, and wherein the content field is created based on processing a plurality of blocks of the rating distributed ledger and a plurality of blocks of the communication events distributed ledger in time synchronization based on executing the executable instructions stored in the third genesis block.

In an embodiment, processing the plurality of blocks of the rating distributed ledger and a plurality of blocks of the communication events distributed ledger in time synchronization comprises using a date and time of a block on the communication events distributed ledger to select a block from the rating distributed ledger to obtain a rating schedule that is valid for the date and time of the block on the communication event distributed ledger. In an embodiment, the content field of each block of the assessed communication toll distributed ledger comprises an identity of a subscription account.

Figure 5A:
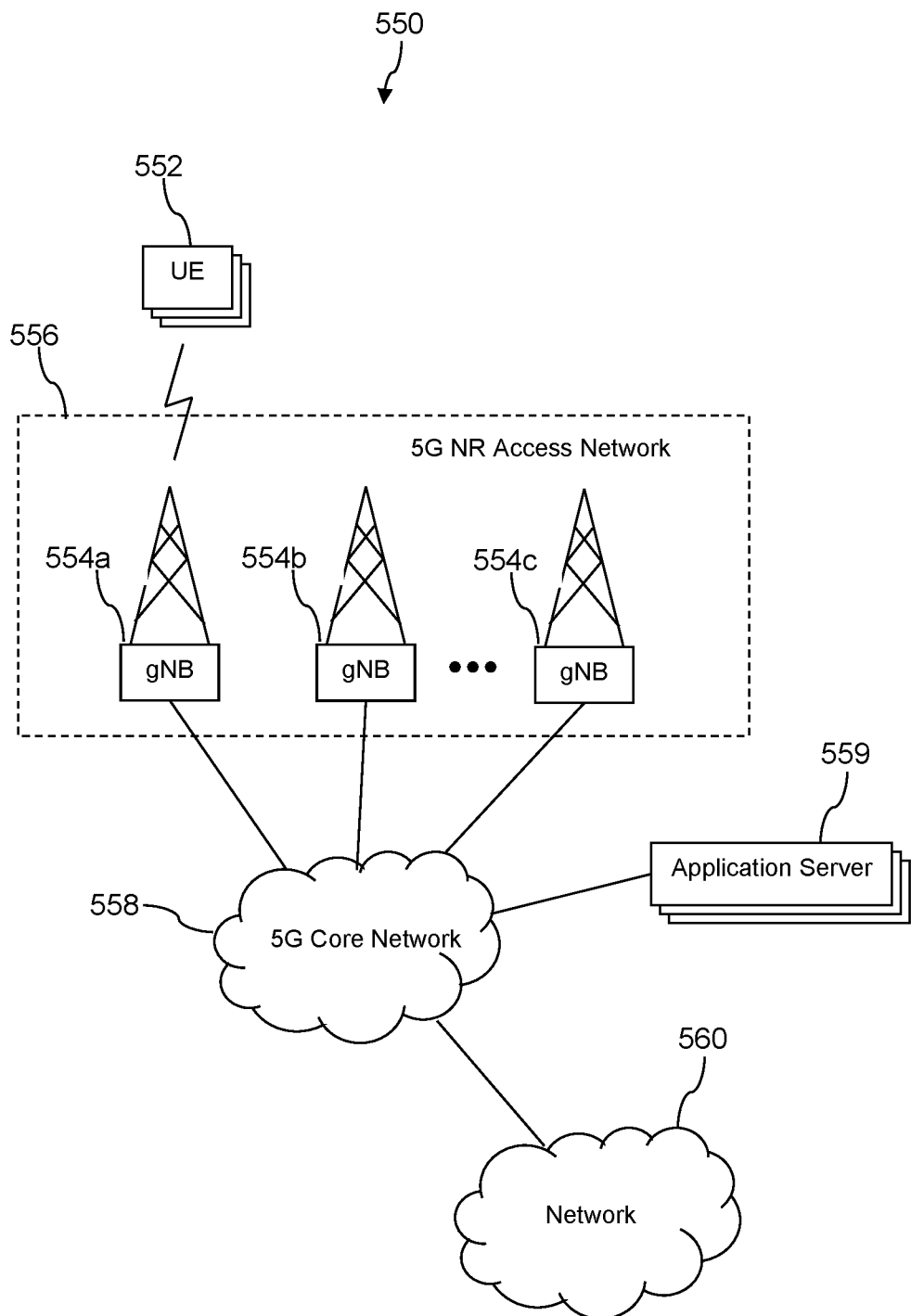
FIG. 5A and FIG. 5B are block diagrams of a 5G communication network according to an embodiment of the disclosure.

Turning now to FIG. 5A, an exemplary communication system 550 is described. In an embodiment, at least part of the network 140 may be implemented in a form consistent with the system 550 described with reference to FIG. 5A and FIG. 5B. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
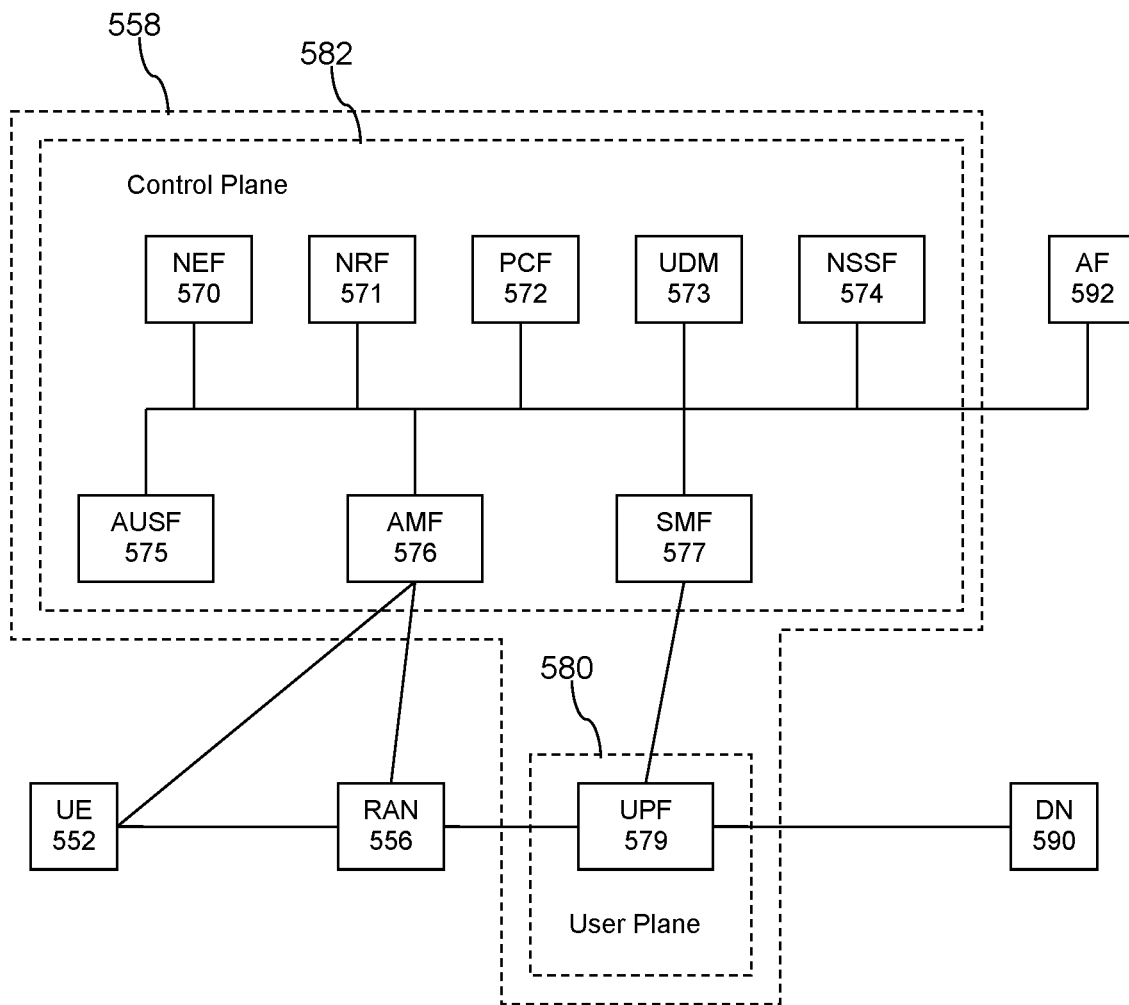

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
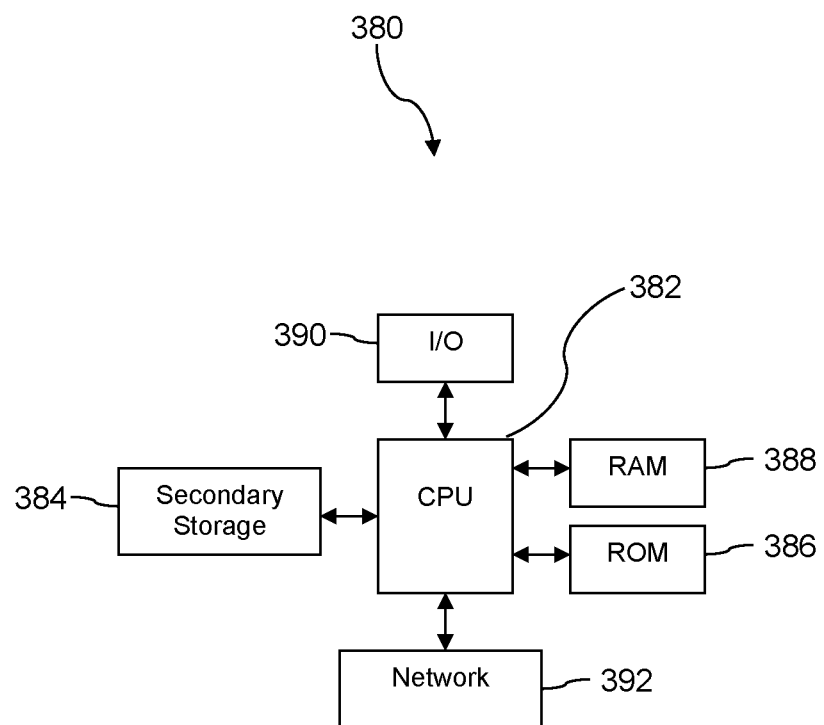
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design.

Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of synchronizing a plurality of distributed ledgers, comprising:
   initializing a first distributed ledger by a first distributed ledger management application executing on a computer system by creating a first genesis block comprising a nonce, a content field comprising metadata about the first distributed ledger, and a block hash value computed by hashing the nonce and the content field;
   building the first distributed ledger by the first distributed ledger management application by creating blocks and adding the blocks to the first distributed ledger, wherein each block comprises a block hash value of the preceding block of the first distributed ledger, a nonce, a content field, and a block hash value computed by hashing the block hash value of the preceding block, the nonce, and the content field of the block;
   initializing a second distributed ledger by a second distributed ledger management application executing on a computer system by creating a second genesis block comprising a nonce, a content field comprising metadata about the second distributed ledger, and a block hash value computed by hashing the nonce and the content field;
   building the second distributed ledger by the second distributed ledger management application by creating blocks and adding the blocks to the second distributed ledger, wherein each block comprises a block hash value of the preceding block of the second distributed ledger, a nonce, a content field, and a block hash value computed by hashing the block hash value of the preceding block, the nonce, and the content field of the block;
   initializing a third distributed ledger by a third distributed ledger management application executing on a computer system by creating a third genesis block comprising a nonce, a content field comprising metadata about the third distributed ledger, and a block hash value computed by hashing the nonce and the content field, wherein the metadata about the third distributed ledger comprises executable instructions that implement a smart contract associated with the third distributed ledger that defines building blocks of the third distributed ledger based in part on synchronized processing of blocks stored in the first distributed ledger and in the second distributed ledger; and
   building the third distributed ledger by the third distributed ledger management application by creating blocks and adding the blocks to the third distributed ledger, wherein each block comprises a block hash value of the preceding block of the third distributed ledger, a nonce, a content field, and a block hash value computed by hashing the block hash value of the preceding block, the nonce, and the content field of the block, and wherein the content field is created based on processing a plurality of blocks of the first distributed ledger and a plurality of blocks of the second distributed ledger in time synchronization based on executing the executable instructions stored in the third genesis block.

2. The method of claim 1, wherein the content field of blocks of the third distributed ledger are created in time synchronization in part based on the third distributed ledger management application selecting blocks from the first distributed ledger based on a validity date of the blocks of the first distributed ledger and based on the third distributed ledger management application selecting blocks from the second distributed ledger based on a validity date of the blocks of the second distributed ledger.

3. The method of claim 2, further comprising:
   receiving a notification by the third distributed ledger management application from the first distributed ledger management application, wherein the notification indicates that a new block has been added to the first distributed ledger;

determining by the third distributed ledger management application that a block on the third distributed ledger is out-of-synchronization with the first distributed ledger based on the notification; and creating a new block by the third distributed ledger management application and adding the new block to the third distributed ledger, wherein the content field of the new block of the third distributed ledger is created based on processing at least the new block of the first distributed ledger and based on processing at least one of the blocks of the second distributed ledger, and wherein the new block of the third distributed ledger supersedes the out-of-synchronization block on the third distributed ledger.

4. The method of claim 3, further comprising designating the out-of-synchronization block on the third distributed ledger as invalid.

5. The method of claim 3, further comprising:

the third distributed ledger application registering with the first distributed ledger to receive notifications when the first distributed ledger application adds new blocks to the first distributed ledger;

the first distributed ledger determining that it has added a new block to the first distributed ledger; and based on determining it has added a new block to the first distributed ledger, sending the notification indicating the new block has been added to the first distributed ledger by the first distributed ledger application to the third distributed ledger application based on the third distributed ledger application registering to receive notifications.

6. The method of claim 1, wherein the executable instructions in the metadata of the content field of the third genesis block comprise references to instructions stored outside of the third distributed ledger and wherein executing the executable instructions stored in the third genesis block by the third distributed ledger management application comprises following the references and executing the referenced instructions stored outside of the third distributed ledger.

7. The method of claim 1, further comprising reading a plurality of blocks from an end of the first distributed ledger by the third distributed ledger management application and storing the plurality of blocks in a memory cache in the computer system that the third distributed ledger management application executes on, wherein the third distributed ledger processing a plurality of blocks of the first distributed ledger comprises processing the plurality of blocks stored in the memory cache.

8. A method of building a first distributed ledger based on synchronization with a proxy distributed ledger comprising a genesis block of a second distributed ledger and a contiguous plurality of last blocks of the second distributed ledger, comprising:

initializing a first distributed ledger by a distributed ledger management application executing on a computer system by creating a first genesis block comprising a nonce, a content field comprising metadata about the first distributed ledger, and a block hash value computed by hashing the nonce and the content field, wherein the metadata about the first distributed ledger comprises executable instructions that implement a smart contract associated with the first distributed ledger that defines building blocks of the first distributed ledger based in part on synchronized processing of blocks stored in a proxy distributed ledger;

initializing the proxy distributed ledger by the distributed ledger management application by reading a genesis block of a second distributed ledger, reading a predefined number of blocks from an end of the second distributed ledger, and establishing the proxy distributed ledger as the combination of the blocks read from the second distributed ledger; and building the first distributed ledger by the distributed ledger management application by creating blocks and adding the blocks to the first distributed ledger, wherein each block comprises a block hash value of the preceding block of the first distributed ledger, a nonce, a content field, and a block hash value computed by hashing the block hash value of the preceding block, the nonce, and the content field of the block, and wherein the content field is created at least in part based on processing one of the blocks of the proxy distributed ledger in time synchronization based on executing the executable instructions stored in the first genesis block.

9. The method of claim 8, wherein processing the one of the blocks of the proxy distributed ledger in time synchronization comprises selecting the one of the blocks based on a validity date of the block stored in a content field of the block.

10. The method of claim 8, further comprising:

receiving by the distributed ledger management application a notification from the second distributed ledger that a new block has been added to the second distributed ledger;

reading the new block by the distributed ledger management application from the second distributed ledger; and adding the new block by the distributed ledger management application to the proxy distributed ledger.

11. The method of claim 10, further comprising:

determining by the distributed ledger application that a block on the first distributed ledger is out of synch with the second distributed ledger based on a validity date stored in a content field of the new block added to the proxy distributed ledger; and creating a new block by the distributed ledger management application and adding the new block to the first distributed ledger, wherein the content field of the new block on the first distributed ledger is created based on processing the new block added to the proxy distributed ledger, wherein the new block on the first distributed ledger supersedes an out-of-synchronization block on the first distributed ledger.

12. The method of claim 11, further comprising designating by the distributed ledger management application the out-of-synchronization block on the first distributed ledger as invalid.

13. The method of claim 8, wherein the blocks after the genesis block in the first distributed ledger comprise a content field that defines a bill for wireless communication service.

14. The method of claim 13, wherein the blocks after the genesis block in the second distributed ledger comprises a content field that defines tax rates for wireless communication services.

15. A method of tolling delivery of a wireless communication service in response to event triggers based on synchronization of a rating distributed ledger that changes over time with a toll assessment distributed ledger, comprising:

initializing a rating distributed ledger by a rating distributed ledger management application executing on a computer system by creating a first genesis block comprising a nonce, a content field comprising metadata about the rating distributed ledger, and a block hash value computed by hashing the nonce and the content field;

building the rating distributed ledger by the rating distributed ledger management application by creating blocks and adding the blocks to the rating distributed ledger, wherein each block comprises a block hash value of the preceding block of the rating distributed ledger, a nonce, a content field, and a block hash value computed by hashing the block hash value of the preceding block, the nonce, and the content field of the block, wherein the content field comprises a rating schedule that maps communication events to a rate of payment for the associated communication events;

initializing a communication events distributed ledger by a communication events distributed ledger management application executing on a computer system by creating a second genesis block comprising a nonce, a content field comprising metadata about the communication events distributed ledger, and a block hash value computed by hashing the nonce and the content field;

building the communication events distributed ledger by the communication events distributed ledger management application by creating blocks and adding the blocks to the second distributed ledger, wherein each block comprises a block hash value of the preceding block of the communication events distributed ledger, a nonce, a content field, and a block hash value computed by hashing the block hash value of the preceding block, the nonce, and the content field of the block, wherein the content field comprises an identity of a communication event and a date and time associated with the communication event;

initializing an assessed communication toll distributed ledger by an accessed communication toll distributed ledger management application executing on a computer system by creating a third genesis block comprising a nonce, a content field comprising metadata about the assessed communication toll distributed ledger, and a block hash value computed by hashing the nonce and the content field, wherein the metadata about the assessed communication toll distributed ledger comprises executable instructions that implement a smart contract associated with the assessed communication toll distributed ledger that defines building blocks of the assessed communication toll distributed ledger based in part on synchronized processing of blocks stored in the rating distributed ledger and in the communication events distributed ledger; and building the assessed communication toll distributed ledger by the assessed communication toll distributed ledger management application by creating blocks and adding the blocks to the assessed communication toll distributed ledger, wherein each block comprises a block hash value of the preceding block of the assessed communication troll distributed ledger, a nonce, a content field, and a block hash value computed by hashing the block hash value of the preceding block, the nonce, and the content field of the block, and wherein the content field is created based on processing a plurality of blocks of the rating distributed ledger and a plurality of blocks of the communication events distributed ledger in time synchronization based on executing the executable instructions stored in the third genesis block.

16. The method of claim 15, wherein processing the plurality of blocks of the rating distributed ledger and the plurality of blocks of the communication events distributed ledger in time synchronization comprises using a date and time of a block on the communication events distributed ledger to select a block from the rating distributed ledger to obtain a rating schedule that is valid for the date and time of the block on the communication event distributed ledger.

17. The method of claim 15, wherein the communication event identified in the content field of the blocks of the communication events distributed ledger comprises an initiation of a phone call, a termination of a phone call, a data session connection, a data session termination, or a measurement information.

18. The method of claim 15, wherein the content field of each block of the assessed communication toll distributed ledger comprises an identity of a subscription account.

19. The method of claim 15, wherein the content field of each block of the communication events distributed ledger identifies a user equipment (UE).

20. The method of claim 19, wherein the UE identified in the content field of each block of the communication events distributed ledger is a cell phone, a smart phone, a personal digital assistant (PDA), a wearable computer, a headset computer, a laptop computer, a notebook computer, a tablet computer, or an Internet of things (IoT) device.

* * * * *